United States Patent

Iida et al.

[11] Patent Number: 6,127,030
[45] Date of Patent: Oct. 3, 2000

[54] MAGNETIC RECORDING MEDIUM

[75] Inventors: Shuji Iida; Kiyoto Fukushima, both of Nagano, Japan

[73] Assignee: TDK Corporation, Tokyo, Japan

[21] Appl. No.: 09/050,181

[22] Filed: Mar. 30, 1998

[30] Foreign Application Priority Data

Mar. 31, 1997 [JP] Japan .................................. 9-079432

[51] Int. Cl.$^7$ ................................................. G11B 05/735
[52] U.S. Cl. ..................................... 428/323; 428/694 BB
[58] Field of Search ............................ 428/323, 694 BB, 428/900

[56] References Cited

U.S. PATENT DOCUMENTS 4,745,017  5/1988  Miyoshi et al. ......................... 428/141

FOREIGN PATENT DOCUMENTS

| 651379 | 5/1995 | European Pat. Off. . |
| 64-050230 | 2/1989 | Japan . |
| 1-134717 | 5/1989 | Japan . |
| 4-044626 | 2/1992 | Japan . |
| 4-081256 | 12/1992 | Japan . |
| 7-153055 | 6/1995 | Japan . |

Primary Examiner—Stevan A. Resan
Attorney, Agent, or Firm—Oblon, Spivak, McClelland, Maier & Neustadt, P.C.

[57] ABSTRACT

Disclosed is a magnetic recording medium good in production efficiency, paint stability and electromagnetic characteristics, and improved in running properties and durability, which has a magnetic layer formed on a surface side of a non-magnetic support and a backcoat layer formed on a back side thereof, in which said backcoat layer is formed by kneading a compounded composition comprising 50 parts to 120 parts by weight of carbon black (P) per 100 parts by weight of a resin binder (B) (P/B=0.5/1 to 1.2/1), said carbon black (P) having an average particle size of 18 nm to 25 nm and a DBP oil absorption of 90 cc/100 g to 125 cc/100 g, 0.3 part to 2.5 parts by weight of large-sized carbon black or carbon graphite having an average particle size of 150 nm to 500 nm per 100 parts by weight of said carbon black, and a vinyl chloride copolymer as the resin binder, said copolymer containing at least amine-modified vinyl units and acidic functional group-containing vinyl units at the same time, so as to satisfy that the concentration of nonvolatile components is 45 to 60%, and that the P/B is 1.5/1 to 3.5/1, and then, dispersing the kneaded compound by dilution.

4 Claims, No Drawings

MAGNETIC RECORDING MEDIUM

FIELD OF THE INVENTION

The present invention relates to a magnetic recording medium such as a magnetic tape, which has a magnetic layer provided on a surface side of a non-magnetic support and a backcoat layer provided on a back side thereof, and particularly to a magnetic recording medium in which a backcoat layer is obtained from a compounded product having specific composition and by specific kneading treatment of the composition.

BACKGROUND OF THE INVENTION

Previously, various magnetic recording media have been proposed in which the composition of backcoat layers is specified.

For example, proposed are "a magnetic recording medium comprising a magnetic recording layer formed on one side of a non-magnetic support and a backcoat layer formed on the other side thereof, in which said backcoat layer contains 40 parts to 180 parts by weight of carbon black per 100 parts by weight of resin binder, said carbon black having an oil absorption of 50 cc/100 g to 70 cc/100 g and a pH of 6.0 to 12" (Japanese Unexamined Patent Publication No. 4-44626); "a magnetic recording medium comprising a magnetic recording layer provided on a surface side of a non-magnetic support and a backcoat layer provided on a back side thereof, in which said backcoat layer contains finely divided carbon black having an average particle size of 0.01 μm to 0.035 μm, coarsely divided carbon black having an average particle size of 0.08 μm to 0.5 μm, and at least one kind of powder selected from a graphite particle powder and a tetrafluoroethylene resin powder" (Japanese Unexamined Patent Publication No. 64-50230); "a magnetic recording medium comprising a magnetic layer formed on a surface side of a non-magnetic support and a backcoat layer formed on a back side thereof, in which said backcoat layer contains finely divided carbon black having an average particle size of 0.01 μm to 0.035 μm and graphitized carbon black having an average particle size of 0.1 μm to 0.5 μm" (Japanese Unexamined Patent Publication No. 1-134717); "a magnetic recording medium having a magnetic layer on one side of a non-magnetic support and a back layer on the other side thereof, said back layer having a thickness of 2 μm or more and containing carbon black, a binder and optionally an inorganic powder, in which said back layer contains at least tow kinds of finely divided carbon black having an average particle size of 10 mμ to 30 mμ and coarsely divided carbon black having an average particle size of 150 mμ to 500 mμ, and the weight ratio (P/B) of the sum (P) of finely divided carbon black, coarsely divided carbon black and the inorganic powder to a binder (B) ranges from 1/0.5 to 1/3.5" (Japanese Examined Patent Publication No. 4-81256); and "a magnetic recording medium comprising a magnetic layer provided on a non-magnetic support, said magnetic layer comprising a binder, and a ferromagnetic powder and carbon black dispersed therein, in which said binder contains a copolymer having amine-modified vinyl units and acidic functional group-containing vinyl units, and said carbon black has a specific surface area of 90 $m^2/g$ to 330 $m^2/g$ and a DBP oil absorption of 45 ml/100 g to 120 ml/100 g" (Japanese Unexamined Patent Publication No.7-153055).

However, the conventional magnetic recording media have various drawbacks. For example, Japanese Unexamined Patent Publication No. 4-44624 discloses that the backcoat layer of the magnetic recording medium described therein is good in running durability and decreases drop out. However, carbon black having an oil absorption of 50 cc/100 g to 70 cc/100 g can not be sufficiently dispersed, with aggregates left, unless it is dispersed at a P/B ratio of 2.5/1 or more, that is, a considerably higher P/B ratio than the ratio desired finally.

The Japanese Unexamined Patent Publication No. 64-50230 describes that the backcoat layer of the magnetic recording medium described therein has a satisfactory surface smoothness and a low friction coefficient against both guide pins made of metal and plastic. However, within this range of the weight ratio of finely divided carbon black/coarsely divided carbon black, the weight ratio of coarsely divided carbon black is too high, so that coarse projections increase on the backcoat layer to cause transcription to the magnetic layer, resulting in reduction in S/N ratio.

Further, Japanese Unexamined Patent Publication No. 1-134717 describes that the backcoat layer of the magnetic recording medium described therein has a satisfactory surface smoothness and a low friction coefficient against both guide pins made of metal and plastic. However, within this range of the weight ratio of finely divided carbon black/coarsely divided graphitized carbon black, the weight ratio of coarsely divided graphitized carbon black is too high, so that coarse projections increase on the backcoat layer to cause offset to the magnetic layer, resulting in reduction in S/N ratio.

With respect to the backcoat layer of the magnetic recording medium described in the Japanese Examined Patent Publication No. 4-81256, a process for efficiently preparing a paint is not described in detail, and the binders described in the examples fail to assure sufficient S/N characteristics and durability for high density recording now required.

Further, Japanese Unexamined Patent Publication No. 7-153055 describes that the magnetic recording medium described therein has the magnetic layer in which carbon black having a specific surface area of 90 $m^2/g$ to 330 $m^2/g$ and a DBP oil absorption of 45 ml/100 g to 120 ml/100 g, and a ferromagnetic powder are dispersed into the binder having amine-modified vinyl units and acidic functional group-modified vinyl units, and therefore is excellent in antistatic effect and electromagnetic characteristics. However, the process for preparing the paint differs from that of the present invention.

Although the preparation of backcoat paints is generally carried out by means of medium-agitation type dispersing devices such as ball mills, sand grinder mills and attriter mills, uniform dispersion can not be achieved in a short time, resulting in poor production efficiency. Then, when composition components are kneaded by means of pressure kneaders, followed by dispersing thereof in sand grinder mills, efficient production becomes possible. In this case, however, the letdown (LD) is conducted, for converting the optimum dispersing viscosity for dispersing in the sand grinder mill and the weight ratio of a pigment (carbon black) to a binder (hereinafter abbreviated as "P/B") to the optimum coating viscosity and the final P/B for coating. In this case, however, the LD shock is liable to occur. In spite of sufficient dispersion in the dispersion step with much effort, the surface properties of the backcoat layer are often deteriorated by a reduction in gloss and generation of aggregates caused by the LD shock. Accordingly, it is not said that the stability of the paint is sufficient. The backcoat layer having poor surface properties causes offset from the backcoat layer to the magnetic layer, resulting in a reduction in SIN.

On the other hand, the smoothing of a surface of the backcoat layer increases the torque against tape guides incorporated in a VHS cassette when the medium starts to run, which enhances the probability of the occurrence of troubles such as poor rewinding.

SUMMARY OF THE INVENTION

It is therefore an object of the present invention to provide a magnetic recording medium good in production efficiency in preparing a paint, good in paint stability, and satisfactory in frictional properties against guides in VHS cassettes.

As a result of intensive studies to solve the above-mentioned problems, the present inventors have discovered that the above-mentioned problems can be solved by kneading a compounded composition containing a specific resin binder and a specific amount of carbon black under specific conditions, thus accomplishing the present invention.

That is to say, the present invention provides (1) a magnetic recording medium having a magnetic layer formed on a surface side of a non-magnetic support and a backcoat layer formed on a back side thereof, in which said backcoat layer is formed by kneading a compounded composition comprising 50 parts to 120 parts by weight of carbon black (P) per 100 parts by weight of a resin binder (B) (P/B=0.5/1 to 1.2/1), said carbon black (P) having an average particle size of 18 nm to 25 nm and a DBP oil absorption of 90 cc/100 g to 125 cc/100 g, 0.3 part to 2.5 parts by weight of large-sized carbon black or carbon graphite having an average particle size of 150 nm to 500 nm per 100 parts by weight of said carbon black, and a vinyl chloride copolymer as the resin binder, said copolymer containing at least amine-modified vinyl units and acidic functional group-containing vinyl units at the same time, so as to satisfy that the concentration of nonvolatile components is 45 to 60%, and that the P/B is 1.5/1 to 3.5/1, and then, dispersing the kneaded compound by dilution; (2) the magnetic recording medium described in (1), in which the content of the amine-modified vinyl units in the vinyl chloride copolymer is 0.03% to 2.3% by weight; and (3) the magnetic recording medium described in (1), in which the content of the acidic functional group-containing vinyl units in the vinyl chloride copolymer is 0.05% to 1.8% by weight.

DESCRIPTION OF THE PREFERRED EMBODIMENTS

Carbon black (P) used in the backcoat layer of the present invention has an average particle size of 18 nm to 25 nm and a DBP oil absorption of 90 cc/100 g to 125 cc/100 g, and is contained in an amount of 50 parts to 120 parts by weight per 100 parts by weight of resin binder (B) (P/B=0.5/1 to 1.2/1). In the present invention, large-sized carbon black or carbon graphite having an average particle size of 150 nm to 500 nm are further contained in an amount of 0.3 part to 2.5 parts by weight per 100 parts by weight of said carbon black.

Finely divided carbon black having an average particle size of less than 18 nm fails to enhance the dispersibility (gloss), whereas exceeding 25 nm deteriorates the surface smoothness and reduces the S/N of the magnetic layer.

The DBP oil absorption of finely divided carbon black is 90 cc/100 g to 125 cc/100 g. If the DBP oil absorption is less than 90 cc/100 g, it becomes difficult to break aggregates formed in the kneading step, so that the dispersing step must be executed at a high P/B to achieve dispersion. However, the P/B and the concentration of nonvolatile components (in the present invention, the ratio of the total weight of the compounded composition to the entire weight of the compounded formulation in which the weight of a solvent is added to the total weight of the compounded composition is taken as the concentration of nonvolatile components, which is hereinafter abbreviated as "NV") are reduced in the dilution step, which causes a large difference from the final P/B. A LD shock is therefore liable to occur in viscosity adjustment (letdown, LD).

Exceeding 125 cc/100 g results in difficulty of causing the LD shock, but the gloss is hard to be improved, and the surface roughness also tends to deteriorate.

When the content of finely divided carbon black is less than 50 parts by weight per 100 parts by weight of binder, the ratio of the binder increases to cause an increase in the friction coefficient, resulting in blocking with the magnetic layer. On the other hand, when the content exceeds 120 parts by weight, the ratio of the binder decreases to make the backcoat layer brittle and deteriorate the resistance to shaving.

It is therefore suitable that the content of carbon black ranges from 50 parts to 120 parts by weight per 100 parts by weight of binder or the P/B ranges from 0.5/1 to 1.2/1.

The backcoat paint is prepared via the dispersing step and then the viscosity adjustment (letdown) step. In order to enhance the dispersibility of carbon black, adjustment must be made in the dispersing step so as to give the viscosity and P/B optimum for dispersion. In the subsequent viscosity adjustment step, the let down (LD) is carried out by addition of a solvent and a resin so as to give the viscosity suitable for coating. In the dispersing step, the viscosity and P/B of the paint are preferably established higher than those of the final paint, because efficient dispersion is performed.

However, the large difference between the P/B in the dispersing step and the final P/B is liable to lead to the LD shock in the letdown step. In spite of sufficient dispersion in the dispersion step with much effort, the surface properties of the backcoat layer are deteriorated by a reduction in gloss and generation of aggregates after the LD.

Accordingly, as carbon black which gives good surface smoothness and less LD shock, and can undergo the letdown to the final P/B, while maintaining the uniformly dispersed state in the dispersing step, carbon black having an average particle size of 18 nm to 25 nm and a DBP oil absorption of 90 cc/100 g to 125 cc/100 g is preferably used.

Such carbon black includes carbon black #990B, #650B and #40B manufactured by Mitsubishi Chemical Corp.

The surface of the backcoat layer is required to be smooth in consideration of the offset toward the magnetic layer. On the other hand, the smoothing increases the torque against tape guides incorporated in a VHS cassette when the medium starts to run, which causes the occurrence of troubles such as poor rewinding.

Therefore, large-sized carbon black or carbon graphite having an average particle size of 150 nm to 500 nm are added to the above-mentioned carbon black paint in an amount of 0.3 parts to 2.5 parts by weight per 100 parts by weight of finely divided carbon black, thereby obtaining the magnetic recording medium which is satisfactory in both the S/N characteristics and the friction characteristics to tape guides.

The large-sized carbon black or carbon graphite having a particle size of less than 150 nm increases the friction coefficient to the guides made of metal or plastic, whereas exceeding 500 nm causes a deterioration of the S/N characteristics because of the offset toward the magnetic layer due to coarse projections.

The large-sized carbon black or carbon graphite is added in an amount of 0.3 part to 2.5 parts by weight per 100 parts by weight of finely divided carbon black. If it is added in an amount of less than 0.3 part by weight, no effect of reducing the friction to the guides made of metal or plastic is observed. On the other hand, exceeding 2.5 parts by weight results in a lowering in the S/N due to the offset.

It is therefore preferred that the particle size of the large-sized carbon black or carbon graphite added to the backcoat layer is 150 nm to 500 nm and the amount thereof is 0.3 part to 2.5 parts by weight per 100 parts by weight of finely divided carbon black.

Such large-sized carbon black or carbon graphite includes carbon black such as Sevacarb MT-CI manufactured by Columbian Carbon, Japan, Co. and MT N990 manufactured by Huber Co., and carbon graphite such as #4100B manufactured by Mitsubishi Chemical Corp.

In recent years, two types of material specifications for tape guides, metal guides plated with chromium or the like and plastic guides formed of polyacetal or the like have been used. Carbon graphite is more preferred to realize low torque to the guides of both the two types.

Although the backcoat paints are generally prepared by means of medium-agitation type dispersing devices such as ball mills, sand grinder mills and attriter mills without kneading, uniform dispersion can not be achieved in a short time, resulting in poor production efficiency. As a pretreatment for improving such treatment with the medium-agitation type dispersing devices (production efficiency), composition components are kneaded by means of pressure kneaders, followed by dispersing thereof in sand grinder mills, whereby efficient production becomes possible.

Such kneading is achieved at a P/B ranging from 1.5/1 to 3.5/1 and at a concentration of nonvolatile compounds (NV) ranging from 45% to 60%. If the amounts of binder and solvent are too much based on carbon black (the case where the P/B and/or the NV is low), a clay-like high viscous paint becomes soft in kneading. Consequently, the shear is not developed in kneading, so that the gloss is not improved. If the amounts of binder and solvent are too little based on carbon black (the case where the P/B and/or the NV is high), the clay-like high viscous paint becomes too hard in kneading to conduct sufficient kneading, resulting in no improvement in gloss. In either case, the binder can not be sufficiently compatible with carbon black without the above-mentioned ranges. Consequently, it takes a long time to obtain the required gloss (the degree of dispersion) in the dispersing device, or even prolonged dispersion results in poor dispersion, which leads to a reduction in S/N.

Although such kneading may be performed in pressure kneaders, open kneaders, continuous kneaders, extruders or twin-roll mills, kneaders are preferably used which easily perform dilution after kneading, and can have the closed structure in which changes in solvent composition are difficult to occur.

The subsequent dispersion is carried out, after the P/B and the NV of the kneaded products are adjusted in kneaders or tanks so that the dispersion of the kneaded products becomes possible in dispersing devices. The P/B and NV suitable for dispersion are adjusted as follows: The P/B is adjusted as high as possible, thereby improving the dispersion efficiency. In particular, it is preferably 0.8/1 to 3.5/1. The NV is preferably 5% to 35%, although the optimum value varies depending on the composition of paint and the type of dispersing device used. An NV of 15 % to 30% is particularly preferred, because of the highest efficiency.

The dispersing devices used for such dispersion may be any, as long as they are medium-agitation type dispersing devices such as sand grinder mills, ball mills and attriter mills. However, sand grinder mills are preferred because continuous production is possible. Dispersing media used in such dispersing devices include a variety of glass beads, ceramic beads and metal beads. However, non-soda glass type glass beads are preferred because the paint is slightly contaminated with impurities, and zirconia beads are most preferred because the contamination with impurities is further decreased.

In the present invention, non-magnetic inorganic compound powder or lubricants can be added as reinforcement materials to the backcoat layers as needed in addition to the above-mentioned components.

As the above-mentioned inorganic compound powders, any of the various non-magnetic compound powders which have hitherto been blended in backcoat layers of magnetic recording media can be used. Examples thereof include $Al_2O_3$, $Cr_2O_3$, $TiO_2$, $\alpha$-$Fe_2O_3$, $BaSO_4$, $CaCO_3$, $BaCO_3$, $MgCO_3$ and SiC. Of these, $CaCO_3$ and/or $\alpha$-$Fe_2O_3$ are particularly effective, and those having an average particle size of about 0.05 $\mu$m to about 0.5 $\mu$m are further preferred. It is also possible to use two or more kinds of them. Further, these inorganic compound powders are preferably added in an amount of about 0.3% to about 20% by weight based on finely divided carbon black.

As the above-mentioned lubricants, any of the higher fatty acids, fatty esters and silicone oils which have hitherto been used in backcoat layers of magnetic recording media can be used. In addition, dispersants such as surfactants, or other known various additives can be used as needed.

The binders used in the present invention are vinyl chloride copolymers containing both amine-modified vinyl units and acidic functional group-containing vinyl units in the same molecules, thereby being able to prepare the backcoat paints having excellent dispersibility and paint stability. Thus, the surface smoothness can be given to the backcoat layers to provide excellent electromagnetic characteristics.

The amount of the amine-modified vinyl units contained in the above-mentioned vinyl chloride copolymer contained in the binder of the present invention is preferably 0.03% to 2.3% by weight, more preferably 0.05% to 2.0% by weight, and most preferably 0.5% to 1.5% by weight. If the content of the amine-modified vinyl units is too high, the stabilization of the paint tends to deteriorate. On the other hand, if the content thereof is too low, the dispersibility of carbon black is liable to deteriorate. The amount of the acidic functional group-containing vinyl units contained is preferably 0.05% to 1.8% by weight, more preferably 0.1% to 1.5% by weight, and most preferably 0.5% to 1.5% by weight. If the content of the acidic functional group-containing vinyl units is too high, the thixotropic properties of the backcoat paint tends to increase and the surface smoothness of the backcoat layer coated is apt to deteriorate. On the other hand, if the content thereof is too low, the stability of the backcoat paint is liable to produce aggregates, which deteriorates the surface properties of the backcoat layer.

The amine-modified vinyl units contained in the vinyl chloride copolymer used in the present invention contain amino groups. The amino groups may be either unsubstituted or substituted amino groups. For example, the amino groups can be introduced by treatment of the vinyl chloride copolymer containing the above-mentioned acidic functional group-containing vinyl units with an amine compound described later. The amine-modified vinyl units may also contain various functional groups exemplified as functional groups contained in the following acidic functional group-containing units.

The functional groups contained in the acidic functional group-containing vinyl units include carboxyl, sulfonic acid, sulfuric acid, phosphoric acid and phosphonic acid groups, and are vinyl units containing at least one of these functional groups. These vinyl groups may be any, as long as they have the above-mentioned functional groups. Examples of the carboxyl group-containing vinyl units include maleic acid, fumaric acid, acrylic acid and methacrylic acid. Examples of the sulfonic acid group-containing units include sodium styrenesufonate, sodium vinylsulfonate, sodium methacrylsulfonate and sulfoethyl acrylate. Of these, maleic acid and fumaric acid having carboxyl groups, sulfoethyl acrylate and sodium methacrylsulfonate having sulfonic acid groups, and 2-acidphosphoxyethyl methacrylate having a phosphoric acid group are particularly preferred.

The copolymers contained in the binders used in the magnetic recording medium of the present invention, which are vinyl chloride copolymers containing the above-mentioned amine-modified vinyl units and acidic functional group-modified vinyl units, contain vinyl chloride, alkylcarboxylic vinyl esters and optionally vinyl alcohols.

Of these constituent units, vinyl acetate is preferably used as the alkylcarboxylic vinyl ester from the standpoint of raw material cost. However, vinyl propionate or vinyl versatate can also be used. Further, vinyl alcohol is obtained by saponifying the alkylcarboxylic acid moieties of the above-mentioned alkylcarboxylic vinyl esters. The content of the alkylcarboxylic vinyl ester is 0.5% to 10% by weight, and preferably 1.0% to 5.0% by weight. The content of vinyl alcohol as a component which may be contained as needed is 0% to 8.0% by weight, and more preferably 3.0% to 6.0% by weight. It is preferred that the remainder excluding these is substantially vinyl chloride. If the content of the alkylcarboxylic vinyl ester is too high, the affinity for carbon black tends to deteriorate in the backcoat paint, resulting in a deterioration of the dispersibility. On the other hand, if the content thereof is too low, the solubility of the resin is apt to deteriorate. If the content of vinyl alcohol optionally added is too high, the saponification ratio becomes high, which causes a reduction in thermal stability of the copolymer and a deterioration in shelf stability.

The average polymerization degree of the copolymer is preferably 200 to 800, and more preferably 300 to 500. If the average polymerization degree is too high, the solubility and dispersibility of the copolymer tends to deteriorate. On the other hand, it is too low, the strength of the backcoat layer is liable to decrease, which causes the development of shavings on the backcoat layer, leading to an increase in drop out.

Such a copolymer may further contain about 0.5% by weight or less of another monomer constituent such as allyl glycidyl ether or 2-hydroxymethyl methacrylate.

The copolymers used in the present invention may be produced according to any processes. For example, vinyl chloride, an alkylcarboxylic vinyl ester and further a monomer such as maleic acid or fumaric acid which contains a functional group contained in the acidic functional group-containing vinyl unit shown above are copolymerized by suspension polymerization, emulsion polymerization, solution polymerization or bulk polymerization. The intermediate copolymer thus obtained is saponified in the presence of an alkali such as KOH or NaOH or an acid such as hydrochloric acid or sulfuric acid as a catalyst together with an organic solvent such as an alcohol. Then, an amine compound described later is added thereto and stirred at an appropriate temperature for a specific period of time until the desired degree of saponification is reached, thereby obtaining the desired copolymer. The copolymer thus obtained includes vinyl alcohol. Further, the copolymer free from vinyl alcohol can be obtained by adding an appropriate solvent such as an alcohol and an amine compound described later to the intermediate copolymer, and conducting the reaction at an appropriate temperature.

Amine compounds used for the above-mentioned amine modification include primary amines, secondary amines or tertiary amines such as aliphatic amines, alicyclic amines, aromatic amines, alkanolamines or alkoxyalkylamines. Specific examples thereof include methylamine, ethylamine, propylamine, butylamine, cyclohexylamine, ethanolmine, naphthylamine, aniline, o-toluidine, diethylamine, dioctylamine, diisobutylamine, diethanolamine, methylethanolamine, dimthylethanolamine, dibutylethanolamine, methyldiethanolamine, 2-methoxyethylamine, N-methylaniline, trimethylamine, triethylamine, triisobutylamine, tridecyl-amine, N-methylbutylamine, N-methyldiphenylamine, hexa-methylenetetramine, triethanolamine, tributylamine, dimethylpropylamine, pyridine, α-picoline, β-picoline, γ-picoline, 2,4-lutidine, quinoline, morpholine, sodium taurinate, potassium sulfanilate, cetylamine sulfonic acid, diaminopropane and hexamethylenediamine.

Addition of such copolymers to the binders can provide the backcoat paints excellent in dispersibility and paint stability. Even if mixtures of copolymers having amine-modified vinyl units and copolymers having acidic functional group-containing units are used in place of the above-mentioned copolymers, an effect equivalent to that of the copolymers used in the present invention containing both the amine-modified vinyl units and the acidic functional group-containing units can not be obtained.

The binder used in the present invention contains the above-mentioned copolymer in an amount of 20% to 80% by weight of the total weight of the binder, and it is preferred that at least one different resin is used in combination therewith as needed. Preferred examples of the resins used in combination include polyurethane resins added for improving the dispersibility in the layers and physical characteristics such as shavings on the backcoat layers.

As the polyurethane resins, ones usually employed in such magnetic recording media can all be used. However, ones having polar groups are preferably used for further improving the dispersibility of carbon black and the like. The use of polyurethane resins having no polar groups reduces the dispersibility of carbon black and the like to deteriorate the surface properties represented by $R_a$ and the like, thus affecting the magnetic layers to cause a deterioration in electromagnetic characteristics.

Preferred examples of the polar groups include sulfonic acid and sulfuric acid groups and esters or salts thereof which contain sulfur, phosphonic acid, phosphinic acid and phosphoric acid groups and esters or salts thereof which contain phosphorus, and groups each containing at least one kind of carboxylic acid group. Of these, a sulfonic acid group (—$SO_3Y$), a carboxylic acid group (—COOY) and a phosphonic acid group (—$PO_3Y$) are particularly preferred, wherein Y may be either H or an alkali metal. These polar groups are preferably contained in an amount of about 0.1 to about 5 groups per one polymer molecule.

The content of the polyurethane resin is preferably 20% to 80% by weight based on the total amount of the resins. If the content is too high, blocking is liable to occur and the running durability tends to deteriorate. On the other hand, if the content is too low, a backcoat paint film tends to become hard and brittle, which causes shavings on the backcoat layer.

As crosslinking agents for hardening the binders, various polyisocyanates, particularly diisocyanates, are preferably used. In particular, at least one of tolylene diisocyanate, hexamethylene diisocyanate and methylene diisocyanate is preferably used. Such crosslinking agents are allowed to react with nitrogen atoms, hydroxyl groups and active hydrogen groups of the above-mentioned copolymers, and further react with active hydrogen groups of the polyurethanes and the polyesters to crosslink them, thereby hardening the backcoat layers. The content of the crosslinking agent is preferably 10 parts to 30 parts by weight per 100 parts by weight of binder resin.

There is no particular limitation on the support used, and a material selected from various flexible resins according to its purpose may be formed into a specified shape and size depending on its specification. Examples of the flexible resins include film-like materials such as polyesters, for example, polyethylene terephthalate and polyethylene naphthalate, and polyamides.

The solvents used include ketone solvents such as methyl ethyl ketone, methyl isobutyl ketone and cyclohexanone, and aromatic solvents such as toluene. They may be used alone or as a mixture of two or more of them according to their purpose.

In the formation of the backcoat layers, the paints are applied and dried by known methods, usually followed by surface smoothing treatment, and then hardened. The thickness of the backcoat layers after drying is preferably 0.2 $\mu$m to 2.0 $\mu$m.

There is no particular limitation on the magnetic layer formed on the side opposite to the backcoat layer.

Examples of the ferromagnetic powders include oxide powders such as $\gamma$-$Fe_2O_3$, Co-containing $\gamma$-$Fe_2O_3$, $Fe_3O_4$, Co-containing $Fe_3O_4$ and $CrO_2$, and fine powders of Fe, Co, Ni and alloys thereof. The so-called coating type magnetic layers in which these ferromagnetic powders and the binders are contained together and the continuous thin film type magnetic layers formed by vacuum deposition or spattering can both be used. Either of the magnetic layers and the backcoat layers may be formed in advance on the non-magnetic supports. On the other hand, in the case of the continuous thin film type magnetic layers, the backcoat layers are usually formed after formation of the magnetic layers.

The present invention will be illustrated with reference to the following examples in more detail.

| Preparation of Paints for Backcoat Layers | |
|---|---|
| (Preparation of Binder Solutions) | |
| Vinyl Chloride Copolymer (selected from Table 3) | 45 parts by weight |
| Polyesterpolyurethane Resin (containing —$SO_3Na$) | 45 parts by weight |
| Methyl Ethyl Ketone | 100 parts by weight |
| Toluene | 80 parts by weight |
| Cyclohexanone | 100 parts by weight |

The above-mentioned composition was stirred with an agitator for 4 hours to dissolve the resins in the solvents.

| (Kneading-Mixing Treatment - Dispersing Treatment) | |
|---|---|
| Finely Divided Carbon Black A (selected from Table 1) | 100 parts by weight |
| Coarse Particles B (selected from Table 2) | 0.8 part by weight |
| $\alpha$-$Fe_2O_3$ (TF-100 manufactured by Toda Kogyo Corp.) | 1 part by weight |
| Binder Solution | 150 parts by weight |

The above-mentioned composition was fed into a pressure kneader, and kneaded for 2 hours. Then, the following composition was added thereto to adjust the viscosity to an optimum value for dispersing treatment.

| Binder Solution | 200 parts by weight |
|---|---|
| Methyl Ethyl Ketone | 135 parts by weight |
| Toluene | 120 parts by weight |
| Cyclohexanone | 135 parts by weight |

The above-mentioned solution and kneaded product were mixed, followed by dispersing in a sand grinder mill.
(Viscosity Adjustment Step)

| (Viscosity Adjustment Step) | |
|---|---|
| Binder Solution | 66 parts by weight |
| Stearic Acid | 1 part by weight |
| Myristic Acid | 1 part by weight |
| Butyl Stearate | 1 part by weight |
| Methyl Ethyl Ketone | 235 parts by weight |
| Toluene | 285 parts by weight |
| Cyclohexanone | 235 parts by weight |

The above-mentioned composition was put into an agitator, and stirred for 1 hour to prepare a solution for viscosity adjustment.

After mixing of the solution for viscosity adjustment with the slurry after dispersing treatment, the mixture was dispersed in a sand grinder mill, followed by circular filtration. Then, an isocyanate compound (Coronate L: manufactured by Nippon Polyurethane Industry Co., Ltd.) was added to this paint in an amount of 1.0 part by weight per 100 parts by weight of paint, and mixed by stirring to prepare a paint for forming a backcoat layer.

In accordance with such a technique for forming the backcoat layer, paints were prepared changing the kind and mixing ratio of binder, finely divided carbon black A and coarse particles B.
Preparation of Paint for Magnetic Layer

| Preparation of Paint for Magnetic Layer | |
|---|---|
| (Preparation of Binder Solution) | |
| Vinyl Chloride Resin (MR-110 manufactured by Nippon Zeon Co., Ltd.) | 10 parts by weight |
| Polyesterpolyurethane ((TS5004 manufactured by Toyobo Co., Ltd., containing —$SO_3Na$) | 5 parts by weight |
| Methyl Ethyl Ketone | 21 parts by weight |
| Toluene | 21 parts by weight |
| Cyclohexanone | 21 parts by weight |

The above-mentioned composition was stirred with an agitator for 6 hours to dissolve the resins in the solvents.

| (Kneading-Mixing Treatment - Dispersing Treatment) | |
|---|---|
| Co-Cladding γ Iron Oxide Magnetic Powder (BET: 35 m²/g) | 100 parts by weight |
| α-Al₂O₃ (HIT-50 manufactured by Sumitomo Chemical Co., Ltd.) | 5 parts by weight |
| Cr₂O₃ (U-1 manufactured by Nippon Chemical Industrial Co., Ltd.) | 5 parts by weight |
| Binder Solution | 40 parts by weight |

The above-mentioned composition was fed into a pressure kneader, and kneaded for 2 hours. Then, the following composition was added thereto to adjust the viscosity to an optimum value for dispersing treatment.

| Binder Solution | 40 parts by weight |
|---|---|
| Methyl Ethyl Ketone | 15 parts by weight |
| Toluene | 15 parts by weight |
| Cyclohexanone | 15 parts by weight |

After mixing, the resulting product was dispersed in a sand grinder mill.

| (Viscosity Adjustment Step) | |
|---|---|
| Stearic Acid | 0.5 part by weight |
| Myristic Acid | 0.5 part by weight |
| Butyl Stearate | 0.5 part by weight |
| Methyl Ethyl Ketone | 65 parts by weight |
| Toluene | 65 parts by weight |
| Cyclohexanone | 65 parts by weight |

The above-mentioned composition was put into an agitator, and stirred for 1 hour to prepare a solution for viscosity adjustment.

After mixing of the solution for viscosity adjustment with the slurry after dispersing treatment, the mixture was dispersed in a sand grinder mill, followed by circular filtration. Then, an isocyanate compound (Coronate L manufactured by Nippon Polyurethane Industry Co., Ltd.) was added to this paint in an amount of 0.8 part by weight per 100 parts by weight of paint, and mixed by stirring to prepare a paint for forming a magnetic layer.

Evaluation Methods (Glossiness)

Using a digital gloss meter, Type GM-3D, manufactured by Murakami Shikisai Gijutsu Kenkyusho (Murakami Color Technique Laboratory), the glossiness (%) of a paint for forming a backcoat layer before and after dilution was measured, and the resulting value was taken as a value for evaluating the dispersibility. The glossiness was measured at a measuring angle of 600 based on the method described in JIS-Z-8741.

(Stability of Paint)

Taking a glossiness of a paint for backcoat layer formation in dispersing as "a", and a glossiness thereof after dilution (letdown) to a viscosity suitable for coating as "b", the difference therebetween, "b-a", was evaluated as the stability to the letdown shock of the paint for backcoat layer formation.

If "b-a" is "+" or does not vary, the stability is good. However, a larger "−" value shows that more aggregates are produced by dilution (confirmed by observation under a microscope), resulting in a deterioration of the surface properties after coating. Accordingly, the surface properties of the magnetic surface is also deteriorated by offset from the backcoat layer to the magnetic layer, so that the electromagnetic characteristics are adversely affected.

(Electromagnetic Characteristics)

Y-S/N: Using an UPSF2 noise meter manufactured by Rhode and Schwarz Co. and a BR-7000A VTR manufactured by Victor Co. of Japan Ltd., a 50% white signal was recorded and reproduced. The difference from a standard VHS tape (VRT-2) was measured and represented by dB.

C-S/N: Using an UPSF2 noise meter manufactured by Rhode and Schwarz Co. and a BR-7000A VTR manufactured by Victor Co. of Japan Ltd., a chroma signal was recorded and reproduced. The difference from a standard VHS tape (VRT-2) was measured and represented by dB.

Y-S/N and C-S/N were both indicated taking the value of Reference Example 1 as a reference (0 dB).

(Shavings on Backcoat Layer)

Under 3 circumstances of low temperature (0° C.), ordinary temperature and humidity (20° C., 60% RH) and high temperature and humidity (40° C., 80% RH), shuttle running of a tape was repeated 100 times. Then, shavings on the backcoat layer and the state of scratches were observed visually and under an optical microscope. A tape on which scratches were developed was taken as "NG". Under each circumstances, 36 reels of tape were prepared for each sample, and allowed to run under the above-mentioned conditions. Then, the number of reels in which "NG" occurred was totaled up, and the evaluation was made based on the following criterion:

⊚; The number of reels in which "NG" occurred=0

○: The number of reels in which "NG" occurred=1–2

Δ: The number of reels in which "NG" occurred=3–5

×: The number of reels in which "NG" occurred=6 or more (Torque to Metal Guide)

A VHS cassette was provided with a brass guide plated with chromium, and each tape sample described above (a 160-minute tape having a length of 330 m) was incorporated therein. Then, using a BR-S605 VTR manufactured by Victor Co. of Japan Ltd., the torque required for rewinding after 1-minute running from the reel head was measured. The torque value at the time when the sample was completely rewound was measured by changing the voltage of a motor used in rewinding the sample on the VTR using direct current, and converted to determine the rewinding torque to the metal guide. A torque value exceeding 260 gf.cm increases the rate of occurrence of running interruption. The evaluation criterion is as follows:

⊚: Less than 240 gf.cm

○: 240 gf.cm to less than 250 gf.cm

Δ: 250 gf.cm to less than 260 gf.cm

×: 260 gf.cm or more (Torque to Plastic Guide)

A VHS cassette was provided with a guide made of polyacetal containing carbon, and each tape sample described above (a 160-minute tape having a length of 330 m) was incorporated therein. Then, using a BR-S605 VTR manufactured by Victor Co. of Japan Ltd., the torque required for rewinding after 1-minute running from the reel head was measured. The torque value at the time when the sample was completely rewound was measured by changing the voltage of a motor used in rewinding the sample on the VTR using direct current, and converted to determine the rewinding torque to the plastic guide. A torque value exceeding 260 gf.cm increases the rate of occurrence of running interruption. The evaluation criterion is the same as with the above-mentioned metal guide.

(Blocking Test)

A glass tube having a diameter of 3.5 cm and the above-mentioned tape sample having a length of 1 m were prepared, and one end of the tape was fixed to the glass tube with a cellophane tape so that the backcoat side of the tape was in contact with the glass tube. A weight of 500 g was attached to the other end of the tape, and the tape was wound around the glass tube while truing up the edges thereof, followed by fixing of the other end with a cellophane tape. After standing under the circumstances of 40° C. and 80% RH for 24 hours, it was further allowed to stand under the circumstances of 20° C. and 60% RH for 6 hours. A weight of 5 g was attached to the leading end of the tape, and the glass tube was rotated to rewind the tape. The adhesion state of the tape to the glass tube at that time was examined. The Judging criterion is as follows:

○: No blocking is observed.

×: Blocking is observed.

(Surface Roughness)

Using a Taristep surface roughness tester manufactured by Rank-Tera-Hopson Co., the surface roughness was measured at a magnification of 10,000× at a measuring wavelength λ of 3.3 μm to 167 μm, based on JIS B 0601 (1982). The length of the measuring sample was 0.5 mm, the value was the average of five measurements, and the unit was converted to nm.

TABLE 1 carbon black particles A

| | average particle size | oil absorption |
|---|---|---|
| A1 | 13 nm | 70 cc/100 g |
| A2 | 14 | 92 |
| A3 | 18 | 78 |
| A4 | 18 | 103 |
| A5 | 18 | 115 |
| A6 | 18 | 130 |
| A7 | 24 | 64 |
| A8 | 24 | 101 |
| A9 | 24 | 110 |
| A10 | 21 | 170 |
| A11 | 28 | 76 |
| A12 | 30 | 100 |
| A13 | 30 | 113 |
| A14 | 28 | 165 |

TABLE 2 large carbon black or carbon graphite B

| | average size | type of carbon black |
|---|---|---|
| B1 | 80 nm | carbon black |
| B2 | 80 | carbon graphite |

TABLE 2-continued large carbon black or carbon graphite B

| | average size | type of carbon black |
|---|---|---|
| B3 | 150 | carbon black |
| B4 | 150 | carbon graphite |
| B5 | 350 | carbon black |
| B6 | 350 | carbon graphite |
| B7 | 500 | carbon black |
| B8 | 500 | carbon graphite |
| B9 | 700 | carbon black |
| B10 | 700 | carbon graphite |

TABLE 3 type of vinyl chloride copolymer resin

| | vinyl chloride | vinyl acetate | vinyl alcohol | amine modified vinyl | acidic functional group containing vinyl |
|---|---|---|---|---|---|
| A | 91 | 3 | 5 | 0.5 | 0.5 |
| B | 91 | 3 | 6 | 0 | 0 |
| C | 91 | 3 | 5.5 | 0 | 0.5 |
| D | 91 | 3 | 5.5 | 0.5 | 0 |
| E | C + D | | | | |
| F | nitrocellulose | | | | |

EXPERIMENT 1 (EXAMPLES 1 TO 3 AND COMPARATIVE EXAMPLES 1 TO 5)

(Study of Kind of Vinyl Chloride Copolymer)

Based on the above-mentioned method for preparing the paint for the backcoat layer, the kind of vinyl chloride copolymer was studied. Vinyl chloride copolymers shown in Table 3 were used, and as carbon black, A8 was used. The production conditions of the backcoat layers were as follows:

Kneading conditions: Kneaded at a P/B of 2.7/1 at an NV of 54% by use of a pressure kneader.

Dispersing conditions: Dispersed at P/B of 1.2/1 at an NV of 25% by use of glass beads in a sand grinder mill.

Diluting conditions: Diluted so as to give a P/B of 1/1 and an NV of 13%.

Results thereof are shown in Table 4.

TABLE 4

| | type of vinyl chloride copolymer | average polymerigation digree of vinyl chloride copolymer | vinyl chloride copolymer % | polyurethane % | glossiness after dispersion a % | glossiness after dilution b % | b−a | Y-S/N (dB) | C-S/N (dB) | backcoat shavings |
|---|---|---|---|---|---|---|---|---|---|---|
| Example 1 | A | 400 | 50 | 50 | 110 | 110 | 0 | 0. | 0.5 | ◎ |
| Example 2 | A | 400 | 30 | 70 | 109 | 110 | 1 | 0.5 | 0.5 | ◎ |
| Example 3 | A | 400 | 70 | 30 | 113 | 114 | 1 | 0.5 | 0.6 | ○ |
| R. Ex 1 | B | 400 | 50 | 50 | 90 | 91 | 1 | −0.5 | −0.4 | Δ |
| R. Ex 2 | C | 400 | 50 | 50 | 95 | 95 | 0 | −0.4 | −0.3 | Δ |
| R. Ex 3 | D | 400 | 50 | 50 | 105 | 84 | −21 | −0.7 | −0.8 | x |
| R. Ex 4 | E | 400 | 25 + 25 | 50 | 105 | 93 | −12 | −0.5 | −0.4 | Δ |
| R. Ex 5 | F | — | 67 | 33 | 98 | 95 | −3 | −0.3 | −0.3 | x |

R. Ex: Reference Example

Vinyl chloride copolymer A having both the amine-modified vinyl units and the acidic functional group-containing units is very good in paint stability after dilution in the dispersing step, and excellent in surface properties of the paint film after coating, thus giving satisfactory electromagnetic characteristics.

On the other hand, vinyl chloride copolymer D having only the amine-modified vinyl units is poor in paint stability in the dispersing step, and deteriorated in surface properties of the paint film after coating because of occurrence of secondary aggregation, leading to a deterioration in electromagnetic characteristics. Further, vinyl chloride copolymer C having only the acidic functional group-containing units has no problem with regard to the paint stability in the dilution step. However, good dispersibility can not be obtained, so that the electromagnetic characteristics are deteriorated. Furthermore, the case where vinyl chloride copolymer C and vinyl chloride copolymer D of equal quantity are mixed is inferior to the case where the singe copolymer has both the amine-modified vinyl units and the acidic functional group-containing units.

In addition, vinyl chloride copolymer B having neither of the functional group units is lowest in dispersion gloss and not practical. Even when the vinyl chloride copolymer is replaced by nitrocellulose, the dispersion gloss and the electromagnetic characteristics are deteriorated, and shavings are also developed on the backcoat layer.

EXPERIMENT EXAMPLE 2 (EXAMPLES 4 TO 12 AND COMPARATIVE EXAMPLES 6 TO 11)
(Study of Kneading Conditions)

Based on the above-mentioned method for preparing the paint for the backcoat layer, the following paints were prepared under the following kneading, dispersing and diluting conditions. As carbon black, A8 was used.

Kneading conditions: Kneaded at a P/B and an NV shown in Table 5 by use of a pressure kneader.
Dispersing conditions: Dispersed at P/B of 1.2/1 at an NV of 25% by use of glass beads in a sand grinder mill.
Diluting conditions: Diluted so as to give a P/B of 1/1 and an NV of 13%.
Results thereof are shown in Table 5.

EXPERIMENT EXAMPLE 3 (EXAMPLE 13 AND COMPARATIVE EXAMPLES 12 TO 14)
(Study of Kneading Conditions)

Based on the above-mentioned method for preparing the paint for the backcoat layer, the following paints kneaded and not kneaded were studied. A pressure kneader was used in kneading. Dispersing was performed at a P/B of 1.2/1 at an NV of 25%, and dilution at a P/B of 1/1 and an NV of 13%. As carbon black, A8 was used.
Results thereof are shown in Table 6.

TABLE 6

|  | kneading | type of vinyl chloride copolymer | mixer | time to be required for producing 1500 L of paint with 95% glossiness |
|---|---|---|---|---|
| Example 13 | yes | A | sand grinder mill | 48 hrs (including kneading hour) |
| R. Ex 12 | no | A | attriter mill | 61 hrs |
| R. Ex 13 | yes | F | sand grinder mill | 60 hrs (including kneading hour) |
| R. Ex 14 | no | F | attriter mill | 69 hrs |

If the P/B is without the range of 1.5/1 to 3.5/1 or the NV is without the range of 45% to 60%, a clay-like high viscous paint can not be obtained. Even if a clay-like paint is obtained, the state thereof is too soft or too hard to conduct sufficient kneading. Further, the production of the paint by use of a dispersing device alone without kneading results in low production efficiency of the paint (exceeding 2 days). Further, the use of nitrocellulose as the binder resin results in lower production efficiency, compared with the use of the vinyl chloride copolymer having both the amine-modified vinyl units and the acidic functional group-containing units, even when dispersing is performed after kneading.

EXPERIMENT EXAMPLE 4 (EXAMPLES 14 TO 31 AND COMPARATIVE EXAMPLES 15 TO 34)
(Study of Large-Sized Carbon Black-Carbon Graphite (Coarse Particles))

Based on the above-mentioned method for preparing the paint for the backcoat layer, paints were prepared changing the kind and amount added of coarse particles B. As the vinyl chloride copolymer, A shown in Table 3 was used.

TABLE 5

| | type of vinyl chloride copolymer | P/B at kneading | NV (%) at kneading | kneading conditions | glossiness after dispersion a % | glossiness after dilution b % | b − a |
|---|---|---|---|---|---|---|---|
| Example 4 | A | 3.5/1 | 45 | ○ | 110 | 110 | 0 |
| Example 5 | A | 3.5/1 | 53 | ○ | 111 | 110 | 1 |
| Example 6 | A | 3.5/1 | 60 | ○ | 112 | 112 | 0 |
| Example 7 | A | 2.5/1 | 45 | ○ | 110 | 111 | 1 |
| Example 8 | A | 2.5/1 | 53 | ○ | 113 | 113 | 0 |
| Example 9 | A | 2.5/1 | 60 | ○ | 109 | 111 | 2 |
| Example 10 | A | 1.5/1 | 45 | ○ | 110 | 109 | −1 |
| Example 11 | A | 1.5/1 | 53 | ○ | 111 | 111 | 0 |
| Example 12 | A | 1.5/1 | 60 | ○ | 110 | 111 | 1 |
| R. Ex 6 | A | 4.0/1 | 40 | x | 85 | 70 | −15 |
| R. Ex 7 | A | 4.0/1 | 53 | x | 86 | 73 | −13 |
| R. Ex 8 | A | 4.0/1 | 65 | x | 90 | 72 | −18 |
| R. Ex 9 | A | 1.3/1 | 40 | x | 98 | 86 | −12 |
| R. Ex 10 | A | 1.3/1 | 53 | x | 95 | 83 | −12 |
| R. Ex 11 | A | 1.3/1 | 65 | x | 90 | 80 | −10 |

The production conditions of the backcoat layers were as follows:

Kneading conditions: Kneaded at a P/B of 2.4/1 at an NV of 54% by use of a pressure kneader.

Dispersing conditions: Dispersed at a P/B of 1.2/1 at an NV of 25% by use of glass beads in a sand grinder mill.

Diluting conditions: Diluted so as to give a P/B of 1/1 and an NV of 13%.

Results thereof are shown in Table 7.

EXPERIMENT EXAMPLE 5 (EXAMPLES 32 TO 44 AND COMPARATIVE EXAMPLES 35 TO 52)

(Study of Finely Divided Carbon Black)

Based on the above-mentioned method for preparing the paint for the backcoat layer, paints were prepared changing the kind of finely divided carbon black A. As the vinyl chloride copolymer, A shown in Table 3 was used.

TABLE 7

|  | carbon A particles | large particle B | amount of B | rewind torque metal guide | rewind torque plastic guide | Y-S/N (dB) | C-S/N (dB) |
|---|---|---|---|---|---|---|---|
| Example 14 | A8 | B3 | 0.5 | ○ | Δ | 0.6 | 0.6 |
| Example 15 | A8 | B3 | 1.0 | ○ | Δ | 0.6 | 0.4 |
| Example 16 | A8 | B3 | 2.5 | ○ | Δ | 0.3 | 0.0 |
| Example 17 | A8 | B4 | 0.5 | ○ | ○ | 0.7 | 0.7 |
| Example 18 | A8 | B4 | 1.0 | ○ | ○ | 0.5 | 0.6 |
| Example 19 | A8 | B4 | 2.5 | ○ | ○ | 0.2 | 0.3 |
| Example 20 | A8 | B5 | 0.5 | ⊚ | ○ | 0.5 | 0.5 |
| Example 21 | A8 | B5 | 1.0 | ⊚ | ○ | 0.4 | 0.3 |
| Example 22 | A8 | B5 | 2.5 | ⊚ | ○ | 0.0 | 0.0 |
| Example 23 | A8 | B6 | 0.5 | ⊚ | ⊚ | 0.5 | 0.5 |
| Example 24 | A8 | B6 | 1.0 | ⊚ | ⊚ | 0.4 | 0.4 |
| Example 25 | A8 | B6 | 2.5 | ⊚ | ⊚ | 0.0 | 0.0 |
| Example 26 | A8 | B7 | 0.5 | ⊚ | ○ | 0.5 | 0.5 |
| Example 27 | A8 | B7 | 1.0 | ⊚ | ○ | 0.2 | 0.2 |
| Example 28 | A8 | B7 | 2.5 | ⊚ | ○ | 0.0 | 0.1 |
| Example 29 | A8 | B8 | 0.5 | ⊚ | ⊚ | 0.5 | 0.5 |
| Example 30 | A8 | B8 | 1.0 | ⊚ | ⊚ | 0.3 | 0.2 |
| Example 31 | A8 | B8 | 2.5 | ⊚ | ⊚ | 0.0 | 0.1 |
| R. Ex 15 | A8 | B1 | 1.0 | x | x | 0.8 | 0.7 |
| R. Ex 16 | A8 | B1 | 2.0 | x | x | 0.0 | 0.0 |
| R. Ex 17 | A8 | B2 | 1.0 | x | x | 0.7 | 0.6 |
| R. Ex 18 | A8 | B2 | 2.0 | x | Δ | 0.0 | 0.1 |
| R. Ex 19 | A8 | B3 | 0.2 | x | Δ | 0.7 | 0.8 |
| R. Ex 20 | A8 | B3 | 3.0 | ⊚ | Δ | −0.4 | −0.4 |
| R. Ex 21 | A8 | B4 | 0.2 | x | Δ | 0.7 | 0.7 |
| R. Ex 22 | A8 | B4 | 3.0 | ⊚ | ○ | −0.3 | −0.4 |
| R. Ex 23 | A8 | B5 | 0.2 | Δ | Δ | 0.6 | 0.5 |
| R. Ex 24 | A8 | B5 | 3.0 | ⊚ | x | −0.3 | −0.3 |
| R. Ex 25 | A8 | B6 | 0.2 | Δ | Δ | 0.5 | 0.6 |
| R. Ex 26 | A8 | B6 | 3.0 | ⊚ | ○ | −0.3 | −0.4 |
| R. Ex 27 | A8 | B7 | 0.2 | Δ | Δ | 0.6 | 0.5 |
| R. Ex 28 | A8 | B7 | 3.0 | ⊚ | x | −0.7 | −0.6 |
| R. Ex 29 | A8 | B8 | 0.2 | Δ | Δ | 0.5 | 0.6 |
| R. Ex 30 | A8 | B8 | 3.0 | ⊚ | ○ | −0.7 | −0.5 |
| R. Ex 31 | A8 | B9 | 0.2 | ○ | Δ | −0.6 | −0.5 |
| R. Ex 32 | A8 | B9 | 1.0 | ○ | x | −1.0 | −0.9 |
| R. Ex 33 | A8 | B10 | 0.2 | ○ | Δ | −0.7 | −0.6 |
| R. Ex 34 | A8 | B10 | 1.0 | ○ | x | −1.0 | −1.0 |

With respect to the particle size of the coarse particles, less than 150 nm causes an increase in the friction coefficient to both the metal and plastic guides, whereas exceeding 500 nm results in a deterioration of S/N because of the offset toward the magnetic layer due to coarse projections.

As to the amount of the coarse particles added, less than 0.5 part by weight has no effect of reducing the friction coefficient to both the metal and plastic guides, whereas exceeding 2.5 parts by weight results in a deterioration of S/N by the offset. It is therefore preferred that large-sized carbon black or carbon graphite having a particle size of 150 nm to 500 nm is added in an amount of 0.5 part to 2.5 parts by weight to the backcoat layer.

The production conditions of the backcoat layers were as follows:

Kneading conditions: Kneaded at a P/B of 2.7/1 at an NV of 54% by use of a pressure kneader.

Dispersing conditions: Dispersed at a P/B shown in Table 8 at an NV of 25% by use of glass beads in a sand grinder mill.

Diluting conditions: Diluted so as to give a P/B shown in Table 8 and an NV of 13%.

Results thereof are shown in Table 8.

TABLE 8

| | carbon A particle B | large particle | P/B at dispersion | P/B after dilution | glossiness after dispersion a % | glossiness after dilution b % | b–a | Ra | Y-S/N (dB) | C-S/N (dB) | blocking | shaving |
|---|---|---|---|---|---|---|---|---|---|---|---|---|
| Example 32 | A4 | B5 | 1.7 | 0.5/1 | 104 | 104 | 0 | 17 | 0.3 | 0.3 | ○ | ⊚ |
| Example 33 | A4 | B5 | 1.7 | 1.0/1 | 104 | 104 | 0 | 17 | 0.4 | 0.3 | ○ | ⊚ |
| Example 34 | A4 | B5 | 1.7 | 1.2/1 | 105 | 105 | 0 | 17 | 0.4 | 0.3 | ○ | ○ |
| Example 35 | A5 | B5 | 1.7 | 0.5/1 | 106 | 106 | 0 | 17 | 0.4 | 0.4 | ○ | ⊚ |
| Example 36 | A5 | B5 | 1.7 | 1.0/1 | 107 | 106 | −1 | 17 | 0.3 | 0.4 | ○ | ⊚ |
| Example 37 | A5 | B5 | 1.7 | 1.2/1 | 107 | 106 | −1 | 17 | 0.3 | 0.2 | ○ | ○ |
| Example 38 | A8 | B5 | 1.7 | 0.5/1 | 110 | 112 | 2 | 16 | 0.5 | 0.4 | ○ | ⊚ |
| Example 39 | A8 | B5 | 1.7 | 1.0/1 | 110 | 113 | 3 | 16 | 0.5 | 0.5 | ○ | ⊚ |
| Example 40 | A8 | B5 | 1.7 | 1.2/1 | 112 | 113 | 1 | 16 | 0.5 | 0.5 | ○ | ○ |
| Example 41 | A9 | B5 | 1.7 | 0.5/1 | 105 | 105 | −1 | 16 | 0.4 | 0.4 | ○ | ⊚ |
| Example 42 | A9 | B5 | 1.7 | 1.0/1 | 105 | 106 | 1 | 16 | 0.4 | 0.5 | ○ | ⊚ |
| Example 43 | A9 | B5 | 1.7 | 1.2/1 | 107 | 107 | 0 | 16 | 0.5 | 0.5 | ○ | ○ |
| R. Ex 35 | A1 | B5 | 1.7 | 1.0/1 | 85 | 82 | −3 | 20 | −0.2 | −0.2 | ○ | Δ |
| R. Ex 36 | A2 | B5 | 1.7 | 1.0/1 | 86 | 85 | −1 | 21 | −0.3 | −0.2 | ○ | ○ |
| R. Ex 37 | A3 | B5 | 1.7 | 1.0/1 | 95 | 96 | 1 | 21 | −0.3 | −0.2 | ○ | ○ |
| R. Ex 38 | A4 | B5 | 1.7 | 0.3/1 | 95 | 93 | −2 | 21 | −0.2 | −0.2 | x | ⊚ |
| R. Ex 39 | A4 | B5 | 1.7 | 1.5/1 | 102 | 105 | 3 | 17 | 0.3 | 0.4 | ○ | x |
| R. Ex 40 | A5 | B5 | 1.7 | 0.3/1 | 98 | 99 | 1 | 20 | −0.1 | −0.2 | x | ⊚ |
| R. Ex 41 | A5 | B5 | 1.7 | 1.5/1 | 107 | 109 | 2 | 17 | 0.2 | 0.2 | ○ | x |
| R. Ex 42 | A6 | B5 | 1.7 | 1.0/1 | 88 | 89 | 1 | 22 | −0.3 | −0.2 | ○ | ⊚ |
| R. Ex 43 | A7 | B5 | 1.7 | 1.0/1 | 95 | 92 | −3 | 21 | −0.2 | −0.3 | ○ | ○ |
| R. Ex 44 | A8 | B5 | 1.7 | 0.3/1 | 100 | 100 | 0 | 18 | 0.3 | 0.3 | x | ⊚ |
| R. Ex 45 | A8 | B5 | 1.7 | 1.5/1 | 113 | 113 | 0 | 16 | 0.5 | 0.5 | ○ | x |
| R. Ex 46 | A9 | B5 | 1.7 | 0.3/1 | 93 | 93 | 0 | 21 | −0.1 | −0.2 | x | ⊚ |
| R. Ex 47 | A9 | B5 | 1.7 | 1.5/1 | 115 | 115 | 0 | 17 | 0.3 | 0.3 | ○ | x |
| R. Ex 48 | A10 | B5 | 1.7 | 1.0/1 | 90 | 90 | 0 | 23 | −0.4 | −0.3 | ○ | Δ |
| R. Ex 49 | A11 | B5 | 1.7 | 1.0/1 | 90 | 87 | −3 | 22 | −0.3 | −0.3 | ○ | Δ |
| R. Ex 50 | A12 | B5 | 1.7 | 1.0/1 | 98 | 98 | 0 | 22 | −0.2 | −0.2 | ○ | Δ |
| R. Ex 51 | A13 | B5 | 1.7 | 1.0/1 | 98 | 98 | 0 | 23 | −0.5 | −0.4 | ○ | Δ |
| R. Ex 52 | A14 | B5 | 1.7 | 1.0/1 | 86 | 87 | 1 | 25 | −0.5 | −0.5 | ○ | Δ |
| Example 44 | A8 | B5 | 2.3 | 1.2/1 | 113 | 113 | 0 | 16 | 0.4 | 0.5 | ○ | ○ |

With respect to the average particle size of finely divided carbon black, less than 18 nm or exceeding 25 nm fails to enhance the dispersion gloss, resulting in a deterioration of the surface smoothness to deteriorate the electromagnetic characteristics of the magnetic layer.

For the DBP oil absorption of finely divided carbon black, less than 90 cc/100 g results in insufficient dispersion to cause no improvement in gloss, unless it is dispersed at a high P/B (for example, at a P/B exceeding 2.0/1). On the other hand, carbon black having a DBP oil absorption exceeding 125 cc/100 g is difficult to cause the letdown shock, but the gloss is hard to be improved, and the surface roughness also tends to deteriorate. The electromagnetic characteristics are therefore deteriorated.

Accordingly, the dispersion of finely divided carbon black of the present invention having a DBP oil absorption of 90 cc/100 g to 125 cc/100 g is preferably conducted at a P/B somewhat higher than that after dilution, within the range of 0.8/1 to 3.5/1.

As to the P/B after dilution, less than 0.5/1 results in the tendency to cause blocking with the magnetic layer, whereas exceeding 1.2/1 makes the backcoat layer brittle, so that shavings are liable to occur.

It is therefore preferred that finely divided carbon black added to the backcoat layer has an average particle size of 18 nm to 25 nm and a DBP oil absorption of 90 cc/100 g to 125 cc/100 g, and the P/B after dilution is preferably 0.5/1 to 1.2/1.

The magnetic recording media according to the present invention are good in paint stability, have no backcoat shavings, are low in rewinding torque value to the metal and plastic guides, and can improve the running properties and durability without adverse effect to the electromagnetic characteristics.

What is claimed is:

1. A magnetic recording medium having a magnetic layer formed on a surface side of a non-magnetic support and a backcoat layer formed on a back side thereof, in which said backcoat layer is a compounded composition comprising a resin binder (B), and 50 to 120 parts by weight of carbon black (P) per 100 parts by weight of said resin binder (B), said carbon black (P) having an average particle size of 18 nm to 25 nm and a DBP oil absorption of 90 cc/100 g to 125 cc/100 g, 0.3 part to 2.5 parts by weight of large-sized carbon black or carbon graphite having an average particle size of 150 nm to 500 nm per 100 parts by weight of said carbon black, and wherein said resin binder comprises 30–80% by weight of said binder of a vinyl chloride copolymer, said copolymer containing at least both amine-modified vinyl units and acidic functional group-containing vinyl units, said backcoat layer having been formed by a process comprising a first step of kneading a composition comprising said carbon black (P) and resin binder (B) in a solvent so as to satisfy that the concentration of non-volatile components is 45 to 60% and that the P/B ratio is 1.5/1 to 3.5/1, and a second step of adding a solvent solution of said resin to change the P/B ratio to 0.5/1 to 1.2/1 and dispersing.

2. The magnetic recording medium according to claim 1, in which the content of the amine-modified vinyl units in the vinyl chloride copolymer is 0.03% to 2.3% by weight.

3. The magnetic recording medium according to claim 1, in which the content of the acidic functional group-containing vinyl units in the vinyl chloride copolymer is 0.05% to 1.8% by weight.

4. The magnetic recording medium according to claim 1, and containing large-sized carbon graphite.

* * * * *